United States Patent [19]

Mechtel

[11] Patent Number: 4,723,585
[45] Date of Patent: Feb. 9, 1988

[54] TIRE TREAD WITH CIRCUMFERENTIAL, TRANSVERSE AND DIAGONAL GROOVES

[76] Inventor: Januarius L. Mechtel, 8675 County Rd. 10E, Waconia, Minn. 55387

[21] Appl. No.: 61,350

[22] Filed: Jun. 15, 1987

[51] Int. Cl.⁴ .............................................. B60C 11/11
[52] U.S. Cl. .............................. 152/209 R; D12/138; D12/146
[58] Field of Search ....................... 152/209 R, 209 D; D12/146, 138, 140

[56] References Cited

U.S. PATENT DOCUMENTS

| D. 59,755 | 11/1921 | Kilborn | 152/209 D |
| D. 63,645 | 7/1923 | Hoffstaedter | D12/146 |
| D. 68,978 | 8/1924 | Litchfield | D12/146 |
| D. 76,886 | 11/1928 | Nesmith | 152/209 D |
| D. 79,686 | 1/1929 | Hower | 152/209 D |
| D. 92,569 | 9/1933 | Anderson | D12/146 |
| D. 122,035 | 8/1940 | Sloteman | D12/146 |
| D. 167,381 | 7/1952 | Thaden | 152/209 D |
| D. 215,133 | 9/1969 | Porter | D12/146 |
| D. 269,173 | 5/1983 | Candiliotis | D12/146 |
| 1,505,233 | 8/1924 | Wolfe | 152/209 R |
| 1,946,367 | 2/1934 | Straight | 152/209 R |
| 2,479,958 | 8/1949 | Norman, Jr. | 152/209 R |
| 3,001,568 | 9/1961 | Suominen | 152/209 R |
| 3,986,545 | 10/1976 | Montagne | 152/209 R |
| 3,998,256 | 12/1976 | Vordier | 152/209 D |
| 4,221,254 | 9/1980 | Roberts et al. | 152/209 D |
| 4,279,283 | 7/1981 | Hitzky | 152/209 R |
| 4,299,264 | 11/1981 | Williams | 152/209 R |
| 4,424,844 | 1/1984 | Fontaine | 152/209 R |
| 4,481,991 | 11/1984 | Pieper | D12/138 |

*Primary Examiner*—Michael Ball
*Attorney, Agent, or Firm*—Sturm & Baker, Ltd.

[57] ABSTRACT

A tire tread is comprised of a plurality of rectangular tread block units disposed in parallel circumferential columns and transversely extending rows substantially perpendicular thereto and which include diagonal grooves extending from opposed corners and which are in axial alignment to provide a plurality of diagonally-transversely extending grooves and including a sipe extending into either end of the rectangular units from the transverse grooves.

9 Claims, 4 Drawing Figures

TIRE TREAD WITH CIRCUMFERENTIAL, TRANSVERSE AND DIAGONAL GROOVES

BACKGROUND OF THE INVENTION

1. Field of the Invention

This invention relates to a tire tread and is more particularly directed to noise reduction, improved heat distribution to lengthen the useful life of a tire and to the removal of snow and water from the road engaging surface.

2. Description of the Prior Art

The development of tire tread designs to improve the operational parameters of tires such as handling, braking, and control has seen the development of many tire tread designs. Diamond-shaped and triangular-shaped tire treads have been used in various arrangements in tire tread designs. The Roberts U.S. Pat. No. 4,221,254, for example, utilizes a plurality of circumferentially spaced triangular tread projections. A transverse groove and triangular blocks may be seen in the Verdier U.S. Pat. No. 3,998,256.

The following is a list of prior art presently known;

| Number | Date | Inventor | For |
| --- | --- | --- | --- |
| 2,479,958 | Aug. 23, 1949 | Norman, Jr. | Tire Tread; |
| 3,986,545 | Oct. 19, 1976 | Montagne | Tire Tread; |
| 3,998,256 | Dec. 21, 1976 | Verdier | Tire with Tread Blocks Having Identical, Circular Ellipses of Inertia; |
| 4,221,254 | Sep. 9, 1980 | Roberts et al. | Tread for Pneumatic Tire; |
| 4,279,283 | Jul. 21, 1981 | Hitzky | High Perimeter Tread Element; |
| 4,299,264 | Nov. 10, 1981 | Williams | Tires; |
| 4,481,991 | Nov. 13, 1984 | Pieper | Tread Configuration for Motor Vehicle Tires; |
| D 59,755 | Nov. 22, 1921 | Kilborn | Tire; |
| D 63,645 | Jul. 13, 1923 | Hoffstaedter | Automobile Tire; |
| D 68,978 | Aug. 26, 1924 | Litchfield | Tire; |
| D 76,886 | Nov. 13, 1928 | Nesmith | Tire; |
| D 79,686 | Jan. 28, 1929 | Hower | Automobile Tire; |
| D 92,569 | Sep. 11, 1933 | Anderson | Vehicle Tire; and |
| D 215,133 | Sept. 2, 1969 | Porten | Pneumatic Tire |

SUMMARY OF THE INVENTION

My invention utilizes a tire tread construction which improves distribution of excess heat, dampens road noise and removes snow and water from the road engaging surface of the tire. A rectangular tread block, having major and minor sides, is divided by diagonal grooves to form four triangular lands. The rectangular tread block units are arranged in circumferentially and transversely spaced apart columns and rows. A circumferentially oriented sipe extends from every minor side as a groove toward the center of the triangular land area. This sipe provides improved heat removal, noise dampening and water removal of the tire tread. The diagonal grooves in the tire tread blocks are aligned so as to form transverse diagonal grooves. The circumferential transverse and diagonal grooves provide for the disbursement of water and snow from the triangular land areas.

Diamond shaped tire treads are disposed on the tire sidewall adjacent the road engaging surface of the tire to provide for improved handling under conditions when the sidewalls are in contact with the road surface.

This combination of tire tread components maximizes the heat disbursement characteristics of the tire tread by using diagonal, transverse and circumferential grooves which also disperse snow and water. The sipe provides improved heat and water disbursement and improved noise dampening of the triangular lands disposed on the minor side of the rectangular block.

BRIEF DESCRIPTION OF THE DRAWINGS

Other objects and advantages of my invention may be had from the following description of an illustrated preferred embodiment and method as shown in the appended drawings in which.

A tire 10 is divided into a sidewall section 20 and a road engaging surface 30. The road engaging surface 30 is the portion of the tire body 10 which under normal conditions is in contact with the road surface. The sidewall section 20 of the tire body 10 is the portion which connects the road engaging surface 30 to the beads on a tire that is mounted on the rim of a wheel.

Figure 2:
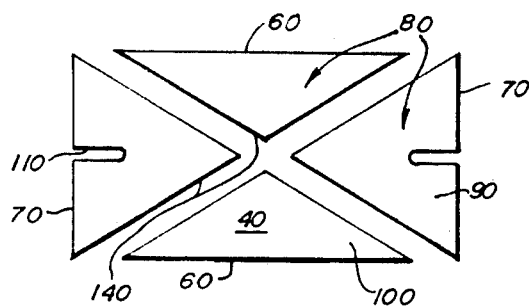
FIG. 2 is an enlarged plan view of a portion of the tire tread.

FIG. 2 is a plan view of a rectangular tread block unit 40. The rectangular tread block unit 40 has major sides 60 and minor sides 70. Rectangular tread block 40 is divided into triangular lands 80 by diagonal grooves 140 which extend between opposing corners of rectangular tread block unit 40. In one preferred embodiment, the triangular lands 80 at minor sides 70 are constructed as equilateral triangular lands 90 and the triangular lands 80 with major sides 60 are constructed with isoscles triangular lands 100.

A sipe 110 is grooved into the triangular lands 90 from the midpoint of the minor sides 70. The groove of sipe 110 extends approximately one fourth the distance from minor side 70 to the opposing corner of triangular land 90.

Figure 3:
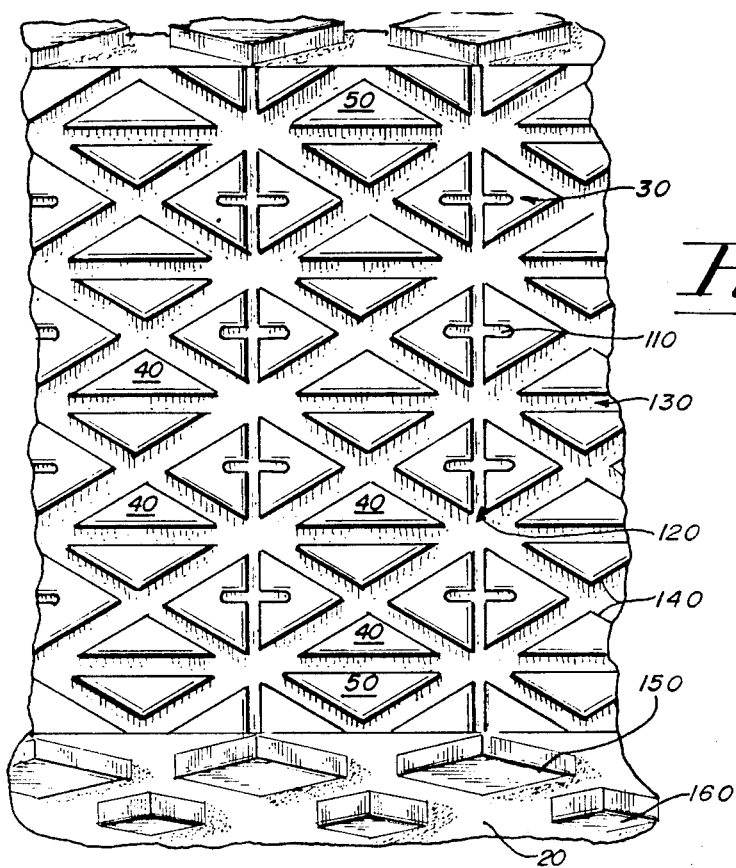
FIG. 3 is an enlarged plan view of a section of the tire tread surface.
Figure 4:
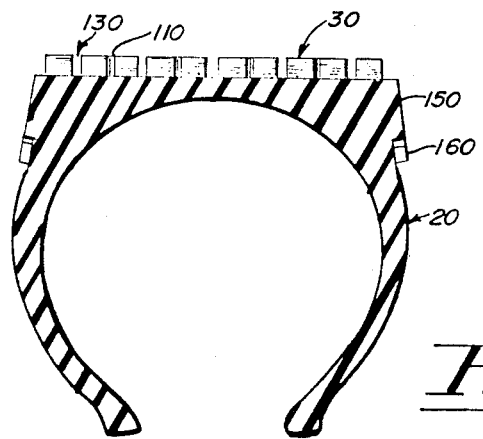
FIG. 4 is a cross section view of the tire taken along plane 4—4 in FIG. 1.

As shown in FIG. 3, rectangular tread block units 40 are spaced such that transverse grooves 120 and circumferential grooves 130 are formed, and so that the diagonal grooves 140 of the rectangular tread block units 40 are in axial alignment. Each side of road engaging surface 30 is comprised of a plurality of similarly spaced apart rectangular block units 50 which are approximately one-half of the width of rectangular block units 40. The widths of circumferential grooves 130 and diagonal grooves 140 are substantially equal. The width of the groove in the sipe 110 and the transverse groove are also substantially equal and approximately one-half the width of circumferential groove 130 and diagonal groove 140.

Figure 1:
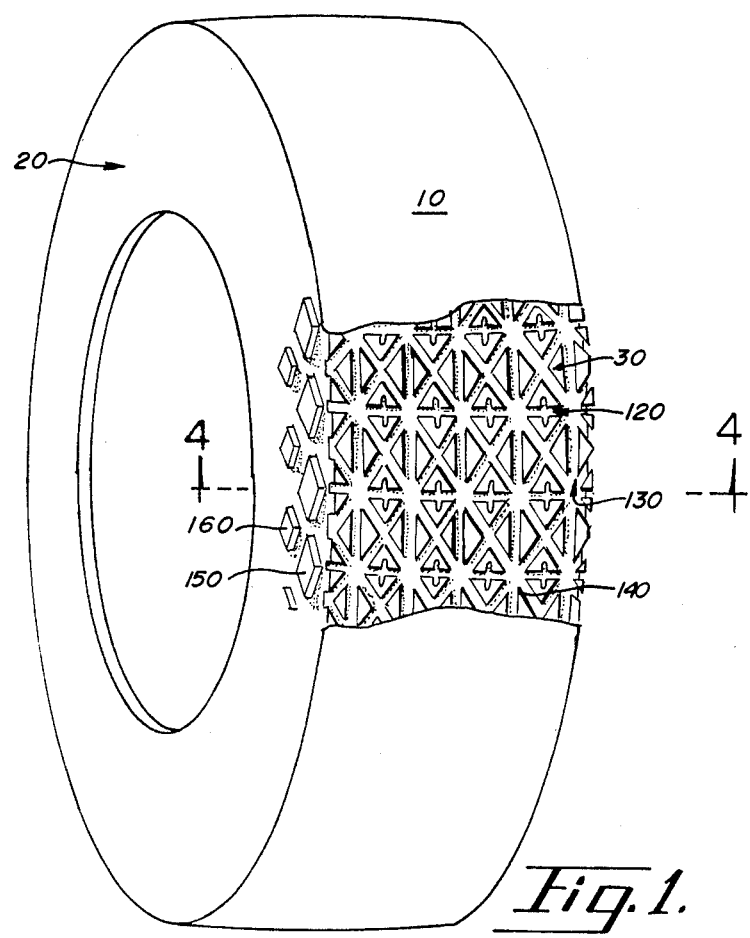
FIG. 1 is a partial perspective view of a tire tread embodying the principles of my invention.

As shown in FIG. 1, a first plurality of spaced apart diamond shaped lands 150 are located on the tire sidewall 20 adjacent the road engaging surface 30. Each of the first diamond shaped lands 150 are centered on each transverse groove 120. A second plurality of spaced apart diamond shaped lands, 160, are disposed on tire sidewall 20 adjacent to the lands 150. Diamond shaped lands 160 are of approximately one-half the size of diamond shaped lands 150. Diamond shaped lands 160 are positioned further up the tire sidewall 20 and between adjacent diamond shaped treads of diamond shaped lands.

I claim:

1. A tire tread, comprising in combination; a tire body having a road engaging surface comprised of a plurality of like rectangular tread block units, each having major and minor sides and diagonal grooves extending intermediate opposing corners of said rectangular tread block unit to form a plurality of triangular tread lands, and a sipe extending inwardly of the triangular lands disposed adjacent the minor sides of said rectangular tread block units, said rectangular tread block units being disposed in circumferentially and transversely extending spaced apart columns and rows and having said diagonal grooves in axial alignment to form a plurality of parallel circumferentially extending grooves, a plurality of transversely extending spaced apart grooves disposed substantially perpendicularly to said circumferentially extending grooves and a plurality of diagonally-transversely extending grooves.

2. The apparatus of claim 1, wherein the triangular tread lands adjacent the minor sides are of equilateral configuration and the triangular tread lands adjacent the major sides are of isosceles configuration for each of the rectangular tread block units.

3. The apparatus of claim 1, wherein the width of the circumferential and the diagonal grooves are substantially equal and the transverse grooves are approximately one-half the width of diagonal and circumferential grooves.

4. The apparatus of claim 1, wherein the width of the sipes is approximately equal to the width of the transverse grooves.

5. The apparatus of claim 1, wherein the sipe extends circumferentially from the midpoint of the minor side approximately one-fourth of the distance required to bisect the triangular lands.

6. The apparatus of claim 1, wherein the rectangular tread units are cut in half circumferentially to form the outer edges of the road engaging surface of the tire.

7. The apparatus of claim 1, wherein a plurality of diamond shaped lands are fixed to the sidewalls adjacent the road engaging surface of the tire.

8. The apparatus of claim 1, wherein a first set of diamond shaped lands extend from each transverse groove on the tire sidewalls adjacent the road engaging surface of the tire to form a plurality of diagonal treads.

9. The apparatus of claim 8, wherein a second set of diamond shaped lands extend from the center of adjacent diamond shaped lands of the first set of diamond shaped lands further up the tire sidewalls from the road engaging surface, the second set of diamond shaped lands being of approximately one half the size of the first set of diamond shaped treads.

* * * * *